US012251819B2

(12) United States Patent
Itozawa et al.

(10) Patent No.: US 12,251,819 B2
(45) Date of Patent: Mar. 18, 2025

(54) TRANSPORT SYSTEM WITH PROTRUDING PORTIONS

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo (JP); Yutaro Takagi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 521 days.

(21) Appl. No.: 17/548,620

(22) Filed: Dec. 13, 2021

(65) Prior Publication Data

US 2022/0258358 A1 Aug. 18, 2022

(30) Foreign Application Priority Data

Feb. 15, 2021 (JP) ................. 2021-022069

(51) Int. Cl.
*B25J 15/00* (2006.01)
*B25J 5/00* (2006.01)
*B25J 9/00* (2006.01)

(52) U.S. Cl.
CPC .......... *B25J 15/0014* (2013.01); *B25J 5/007* (2013.01); *B25J 9/0009* (2013.01)

(58) Field of Classification Search
CPC ....................................................... B25J 5/007
See application file for complete search history.

(56) References Cited

U.S. PATENT DOCUMENTS

| 6,234,550 B1* | 5/2001 | Stoltenhoff .......... B65G 1/0435 294/902 |
| 9,120,622 B1* | 9/2015 | Elazary ..................... B66F 9/07 |
| 11,738,944 B2* | 8/2023 | Iwamoto ................ B66F 9/063 414/807 |
| 11,919,157 B2* | 3/2024 | Iwamoto .............. B65G 1/0435 |
| 2005/0047895 A1* | 3/2005 | Lert, Jr. ............... B65G 1/1378 414/273 |
| 2015/0071743 A1 | 3/2015 | Lert, Jr. |
| 2020/0172332 A1* | 6/2020 | Moulin ................ B65G 1/0435 |
| 2020/0216298 A1* | 7/2020 | Gravelle ............... B66F 9/122 |
| 2021/0395007 A1* | 12/2021 | Galluzzo ............. B65G 1/1371 |
| 2022/0105621 A1* | 4/2022 | Otsuki ...................... B25J 5/00 |
| 2022/0258974 A1* | 8/2022 | Iwamoto ............. B65G 1/0492 |

(Continued)

FOREIGN PATENT DOCUMENTS

| CN | 104003089 A | 8/2014 |
| CN | 106956892 A | 7/2017 |

(Continued)

OTHER PUBLICATIONS

Translation of Apr. 2, 2024 Office Action issued in Japanese Patent Application No. 2021-022069.

*Primary Examiner* — Gerald McClain
(74) *Attorney, Agent, or Firm* — Oliff PLC

(57) ABSTRACT

A transport system is a transport system in which an autonomous mobile robot transports an object. The autonomous mobile robot includes a mounting portion on which the object is mounted. The mounting portion includes a guide that engages with the object and regulates a moving direction of the object on a surface of the mounting portion to a predetermined direction.

3 Claims, 11 Drawing Sheets

(56) References Cited

U.S. PATENT DOCUMENTS

2022/0259024 A1\* 8/2022 Itozawa ................... B66F 9/18
2022/0267091 A1\* 8/2022 Ota ....................... B66F 9/0755
2022/0274777 A1\* 9/2022 Ota ...................... B65G 1/0492

FOREIGN PATENT DOCUMENTS

| CN | 210423437 U | | 4/2020 | |
|---|---|---|---|---|
| CN | 111806334 A | | 10/2020 | |
| EP | 3978198 A1 | \* | 4/2022 | ............... B25J 5/00 |
| GB | 938618 A | | 10/1963 | |
| JP | S55-053654 Y2 | | 12/1980 | |
| JP | 61107726 U | \* | 7/1986 | |
| JP | S61-107726 U | | 7/1986 | |
| JP | H08-295242 A | | 11/1996 | |
| JP | 11029207 A | \* | 2/1999 | |
| JP | 2005-066809 A | | 3/2005 | |
| JP | 2008-273258 A | | 11/2008 | |
| JP | 2013234048 A | \* | 11/2013 | |
| JP | 2015-178141 A | | 10/2015 | |
| JP | 2017-505559 A | | 2/2017 | |
| JP | 2017-088286 A | | 5/2017 | |
| JP | 2017-190110 A | | 10/2017 | |
| JP | 2020-006846 A | | 1/2020 | |
| WO | 2015/077025 A1 | | 5/2015 | |

\* cited by examiner

TRANSPORT SYSTEM WITH PROTRUDING PORTIONS

CROSS-REFERENCE TO RELATED APPLICATION

This application claims priority to Japanese Patent Application No. 2021-022069 filed on Feb. 15, 2021, incorporated herein by reference in its entirety.

BACKGROUND

1. Technical Field

The present disclosure relates to a transport system, a transport method and a storage medium, and more particularly to a transport system, a transport method and a storage medium in which an autonomous mobile robot transports an object.

2. Description of Related Art

Various robots have been developed to transport objects. For example, Japanese Unexamined Patent Application Publication No. 2005-66809 (JP 2005-66809 A) discloses an agricultural work assistance robot for transporting agricultural products. The agricultural work assistance robot is provided with an engaging portion protruding from the upper surface of a main body portion. A box for storing agricultural products can be fixed to the main body by engaging a recessed portion provided on the bottom surface of the box with the engaging portion.

SUMMARY

The inventors are studying an autonomous mobile robot that loads and unloads an object to and from a mounting portion by sliding and moving the object on the upper surface of the mounting portion provided for the autonomous mobile robot. When the object moves freely on the upper surface of the mounting portion, movement of the object for loading and unloading is not stable, which makes it difficult to load and unload the object to and from the mounting portion. According to the configuration disclosed in JP 2005-66809 A, the free movement of the object can be suppressed. However, the object cannot be slid and moved on the upper surface of the mounting portion, and this hinders loading and unloading of objects to and from the mounting portion.

The present disclosure has been made in consideration of the above circumstances as the background, and provides a transport system, a transport method and a storage medium capable of easily loading and unloading an object to and from the mounting portion by moving the object on the mounting portion.

A first aspect of the present disclosure for achieving the above object is a transport system in which an autonomous mobile robot transports an object. The autonomous mobile robot includes a mounting portion on which the object is mounted. The mounting portion includes a guide that engages with the object mounted on the mounting portion and regulates a moving direction of the object on a surface of the mounting portion to a predetermined direction. According to the transport system, when the object is moved on the mounting portion, the direction of movement is restricted by the guide. Therefore, it is possible to suppress rotation of the object during movement and stabilize the movement. Accordingly, it is possible to easily load and unload the object to and from the mounting portion by moving the object on the mounting portion.

According to the first aspect, the guide may be a protruding portion extending in the predetermined direction on an upper surface of the mounting portion.

According to such a configuration, the movement of the object on the mounting portion can be stabilized by a simple configuration.

According to the first aspect, a side surface of the protruding portion along the predetermined direction may have a shape protruding outward in a width direction above a lower end of the protruding portion.

According to such a configuration, the movement of the object fitted with the guide in the vertical direction is hindered. Therefore, it is possible to suppress falling of the object from the mounting portion.

According to the first aspect, the transport system may further include the object that is a container, and a groove corresponding to a shape of the protruding portion may be provided on a bottom surface of the object.

According to such a configuration, it is possible to provide a transport system using a container that fits with the guide.

According to the first aspect, the guide may be a groove extending in the predetermined direction on an upper surface of the mounting portion.

According to such a configuration, the movement of the object on the mounting portion can be stabilized by a simple configuration.

According to the first aspect, a side surface of the groove along the predetermined direction may have a shape protruding outward in a width direction above an upper end of the groove.

According to such a configuration, the movement of the object fitted with the guide in the vertical direction is hindered. Therefore, it is possible to suppress falling of the object from the mounting portion.

According to the first aspect, the mounting portion may include a recessed portion extending in the predetermined direction on each side of the groove.

According to such a configuration, the object can be moved on the mounting portion along the guide even when the object provided with the protruding portion on the bottom surface includes the legs.

According to the first aspect, the transport system may further include the object that is a container, and a protruding portion corresponding to a shape of the groove may be provided on a bottom surface of the object.

According to such a configuration, it is possible to provide a transport system using a container that fits with the guide.

According to the first aspect, the guide may include two rails that face inward of each other and extend in the predetermined direction at an interval corresponding to a width of the object, and the two rails may extend to a predetermined height from an upper surface of the mounting portion.

According to such a configuration, the movement of the object on the mounting portion can be stabilized by a simple configuration.

According to the first aspect, the guide may include an urging member that urges each of the two rails in a direction approaching each other.

According to such a configuration, the object fitted with the guide can be removed or the object can be fitted with the guide by moving the object in the vertical direction with a force of a predetermined magnitude or more. Therefore, convenience is improved.

According to the first aspect, the transport system may further include the object that is a container, and a groove corresponding to a shape of each of the rails may be provided on a side surface of the object.

According to such a configuration, it is possible to provide a transport system using a container that fits with the guide.

According to the first aspect, the autonomous mobile robot may include a protruding portion that is protrudable upward on an upper surface of the mounting portion; and the autonomous mobile robot may insert the protruding portion into a hole provided in a bottom surface of the object mounted on the mounting portion.

According to such a configuration, the movement of the object in the direction of the guide is also restricted, whereby falling of the object can be suppressed.

A second aspect of the present disclosure is a transport method in which an autonomous mobile robot transports an object. The autonomous mobile robot includes a mounting portion on which the object is mounted, a guide that is provided with the mounting portion and engages with the object mounted on the mounting portion and regulates a moving direction of the object on a surface of the mounting portion to a predetermined direction, and a protruding portion that is protrudable upward on an upper surface of the mounting portion. The transport method includes: moving the protruding portion toward a hole provided in a bottom surface of the object; inserting the protruding portion into the hole; and moving the object on the mounting portion with the guide of the mounting portion engaged with the object.

A third aspect of the present disclosure is a storage medium storing instructions that are executable by one or more processors and that cause the one or more processors to perform functions. The processor is provided with an autonomous mobile robot. The autonomous mobile robot includes a mounting portion on which an object is mounted, a guide that is provided with the mounting portion and engages with the object mounted on the mounting portion and regulates a moving direction of the object on a surface of the mounting portion to a predetermined direction, and a protruding portion that is protrudable upward on an upper surface of the mounting portion. The functions includes: moving the protruding portion toward a hole provided in a bottom surface of the object; inserting the protruding portion into the hole; and moving the object on the mounting portion with the guide of the mounting portion engaged with the object.

According to the present disclosure, it is possible to provide a transport system, a transport method and a storage medium capable of easily loading and unloading the object to and from the mounting portion by moving the object on the mounting portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described below with reference to the drawings.

First Embodiment

Figure 1:
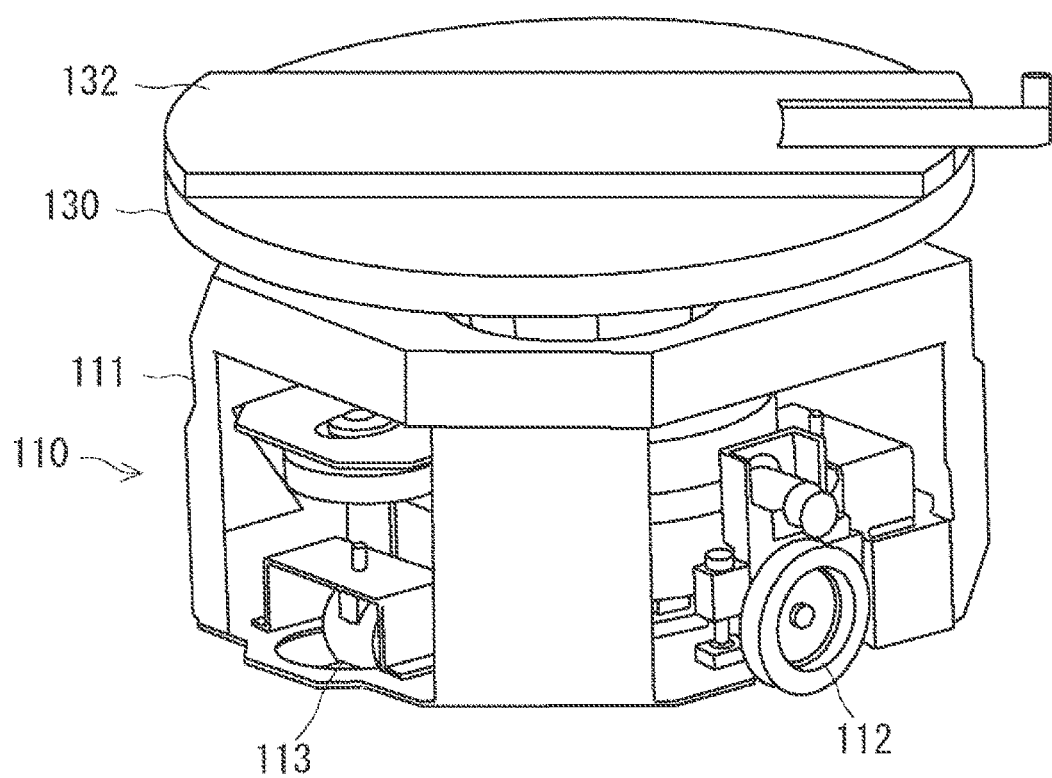
FIG. 1 is a perspective view showing a schematic configuration of an autonomous mobile robot according to an embodiment.
Figure 2:
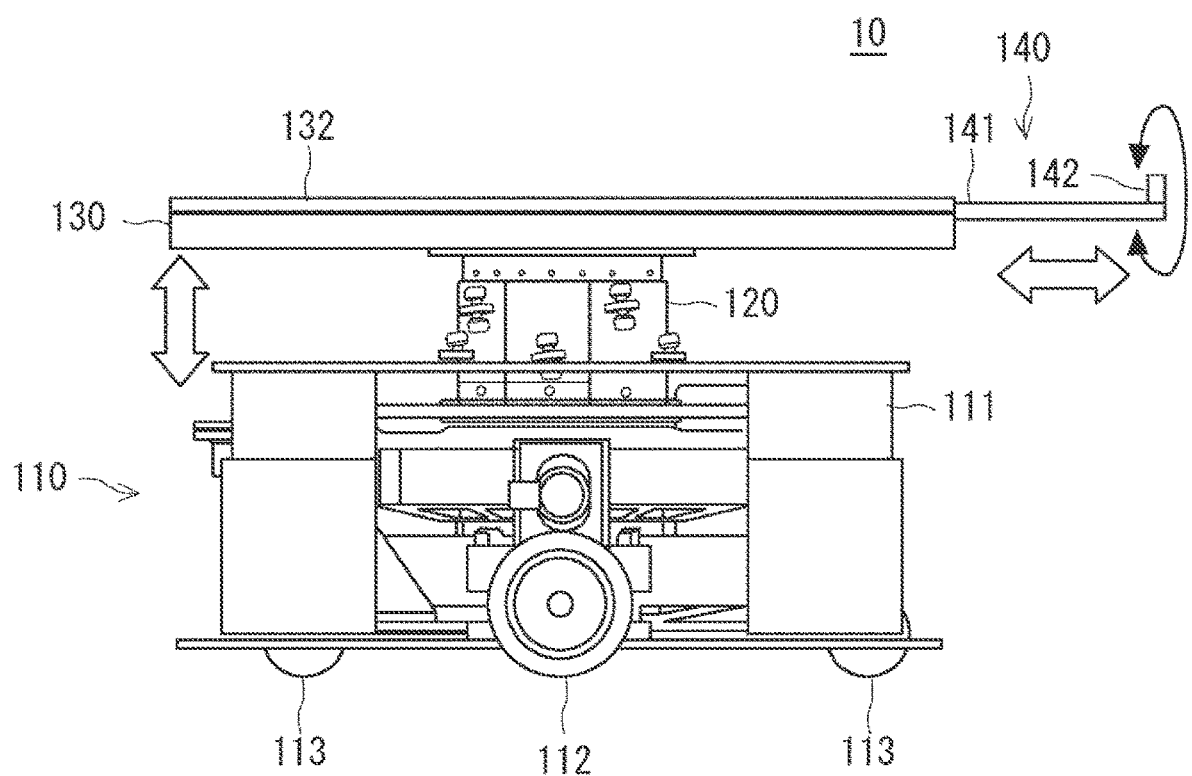
FIG. 2 is a side view showing a schematic configuration of the autonomous mobile robot according to the embodiment.
Figure 3:
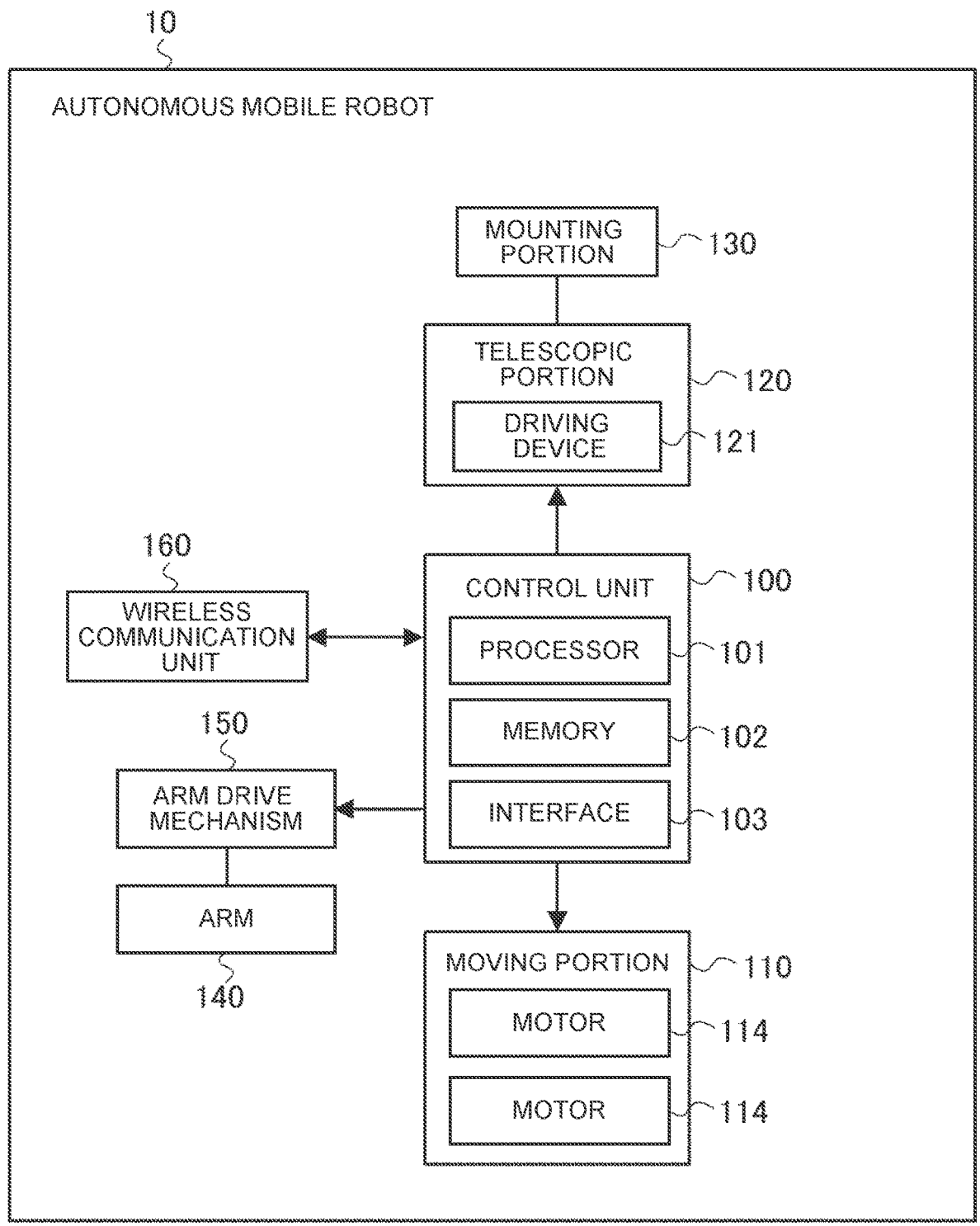
FIG. 3 is a block diagram showing a schematic system configuration of the autonomous mobile robot according to the embodiment.

FIG. 1 is a perspective view showing a schematic configuration of an autonomous mobile robot 10 according to the present embodiment. FIG. 2 is a side view showing a schematic configuration of the autonomous mobile robot 10 according to the present embodiment. FIG. 3 is a block diagram showing a schematic system configuration of the autonomous mobile robot 10 according to the present embodiment.

The autonomous mobile robot 10 according to the present embodiment is a robot that autonomously moves in a moving environment such as a house, a facility, a warehouse, a factory, or an outdoor environment, and may belong to a transport system in which the autonomous mobile robot 10 supports and transports an object. The autonomous mobile robot 10 according to the present embodiment includes a moving portion 110 that is movable, a telescopic portion 120 that expands and contracts in the vertical direction, a mounting portion 130 for supporting a mounted object, an arm 140, an arm drive mechanism 150, a control unit 100 that controls the autonomous mobile robot 10 including control of the moving portion 110, the telescopic portion 120, and the arm 140, and a wireless communication unit 160.

The moving portion 110 includes a robot body 111, a pair of right and left drive wheels 112 and a pair of front and rear driven wheels 113 that are rotatably provided for the robot body 111, and a pair of motors 114. The motors 114 drive the respective drive wheels 112. Each motor 114 rotates the corresponding drive wheel 112 via a speed reducer or the like. Each motor 114 rotates the corresponding drive wheel 112 in accordance with a control signal from the control unit 100, thereby enabling forward movement, backward movement, and rotation of the robot body 111. With this configuration, the robot body 111 can move to an arbitrary position. Note that, the configuration of the moving portion 110 is an example, and the present disclosure is not limited to this. For example, the number of the drive wheels 112 and the driven wheels 113 of the moving portion 110 may be arbitrary, and a known configuration can be applied as long as the robot body 111 can be moved to an arbitrary position.

The telescopic portion 120 is a telescopic mechanism that expands and contracts in the vertical direction. The telescopic portion 120 may be configured as a telescopic type expansion and contraction mechanism. The mounting portion 130 is provided at the upper end of the telescopic portion 120, and the mounting portion 130 is raised or lowered by the operation of the telescopic portion 120. The telescopic portion 120 includes a driving device 121 such as a motor, and expands and contracts as the driving device 121 is driven. That is, the mounting portion 130 is raised or lowered as the driving device 121 is driven. The driving device 121 is driven in response to a control signal from the control unit 100. Note that, in the autonomous mobile robot 10, any known mechanism for controlling the height of the mounting portion 130 provided on the upper side of the robot body 111 may be used instead of the telescopic portion 120.

The mounting portion 130 is provided in an upper portion (at a tip) of the telescopic portion 120. The mounting portion 130 is lifted and lowered by the driving device 121 such as a motor. In the present embodiment, the mounting portion 130 is used for loading the object to be transported by the autonomous mobile robot 10. In order to transport the object, the autonomous mobile robot 10 moves together with the object while the object is supported by the mounting portion 130. With this configuration, the autonomous mobile robot 10 transports the object.

The mounting portion 130 includes, for example, a plate material serving as an upper surface and a plate material serving as a lower surface. A space for accommodating the arm 140 and the arm drive mechanism 150 is provided between the upper surface and the lower surface. In the present embodiment, the shape of the plate materials, that is, the shape of the mounting portion 130 is, for example, a disk shape. However, any other shape may be used. The mounting portion 130 includes a guide 132 that engages with an object mounted on the mounting portion 130 and regulates the moving direction of the object on the surface of the mounting portion 130 to a predetermined direction. Here, the predetermined direction is a straight direction defined on the surface of the mounting portion 130, and specifically, the direction in which the arm 140 is moved in and out. In the present embodiment, the guide 132 is a protruding portion extending in the predetermined direction on the upper surface of the mounting portion 130. The guide 132 is provided so as to pass through the center of the mounting portion 130, for example. More specifically, in the present embodiment, the mounting portion 130 is provided with a cutout 131 along a line of flow of the arm 140 such that, when the arm 140 is moved, a protruding portion 142 of the arm 140 does not interfere with the mounting portion 130 (see FIGS. 4 and 5). The cutout 131 is provided at least on the upper surface of the mounting portion 130.

The mounting portion 130 is provided with the arm 140 that is horizontally moved in and out of the mounting portion 130. The arm 140 includes a shaft portion 141 that extends in the horizontal direction and a protruding portion 142 that extends in a direction perpendicular to the shaft portion 141 and is provided at a tip of the shaft portion 141. That is, in the present embodiment, the arm 140 has an L-shape. Further, the mounting portion 130 is provided with the arm drive mechanism 150 that moves the arm 140 in the horizontal direction (that is, the direction along the shaft portion 141, in other words, the longitudinal direction of the arm 140) and rotates around the shaft portion 141, based on the control signal received from the control unit 100. The arm drive mechanism 150 includes, for example, a motor and a linear guide, and moves the arm 140 in the horizontal direction and rotates the shaft portion 141. However, as the arm drive mechanism 150, a known mechanism for performing the operations above may be used.

As described above, the arm 140 is movable in the horizontal direction, and the protruding portion 142 is rotatable as the shaft portion 141 rotates. That is, the protruding portion 142 is rotatable with the shaft portion 141 as the rotation axis.

Figure 4:
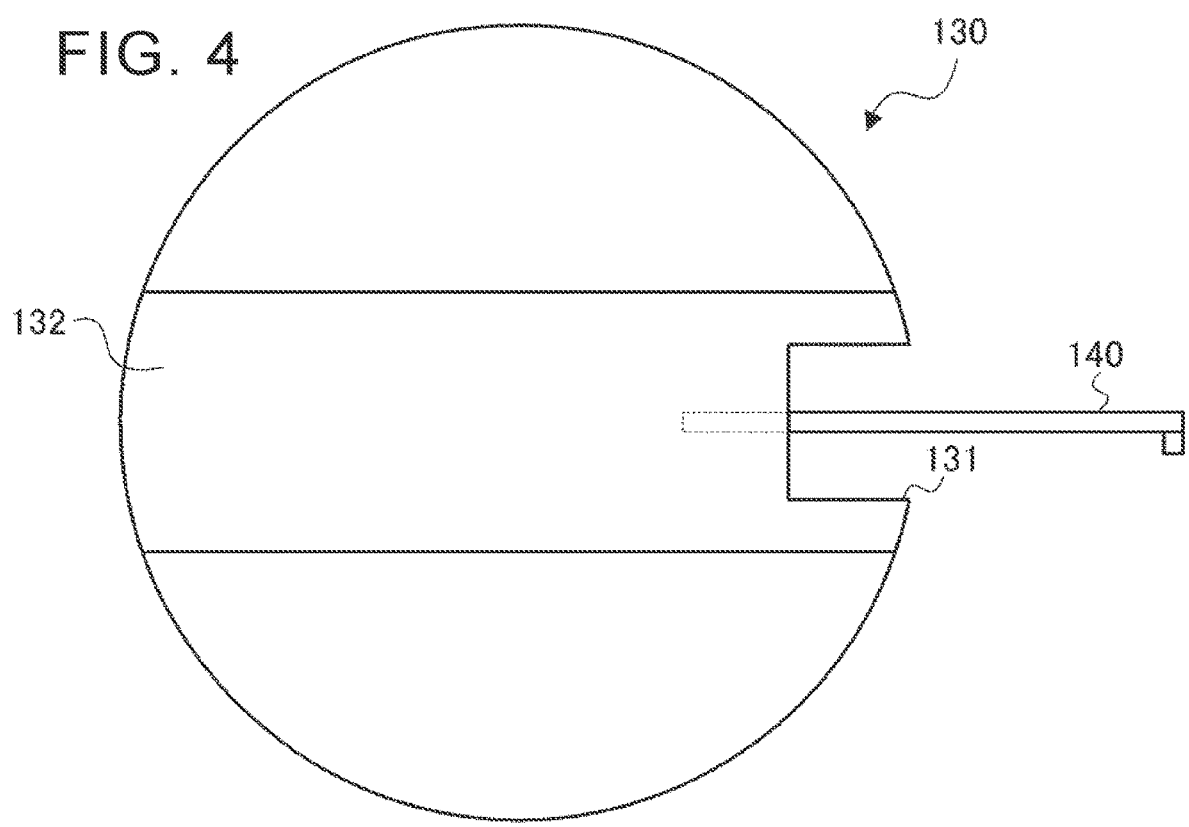
FIG. 4 is a plan view of a mounting portion in a state in which the tip of an arm protrudes outward of the mounting portion in the horizontal direction.
Figure 5:
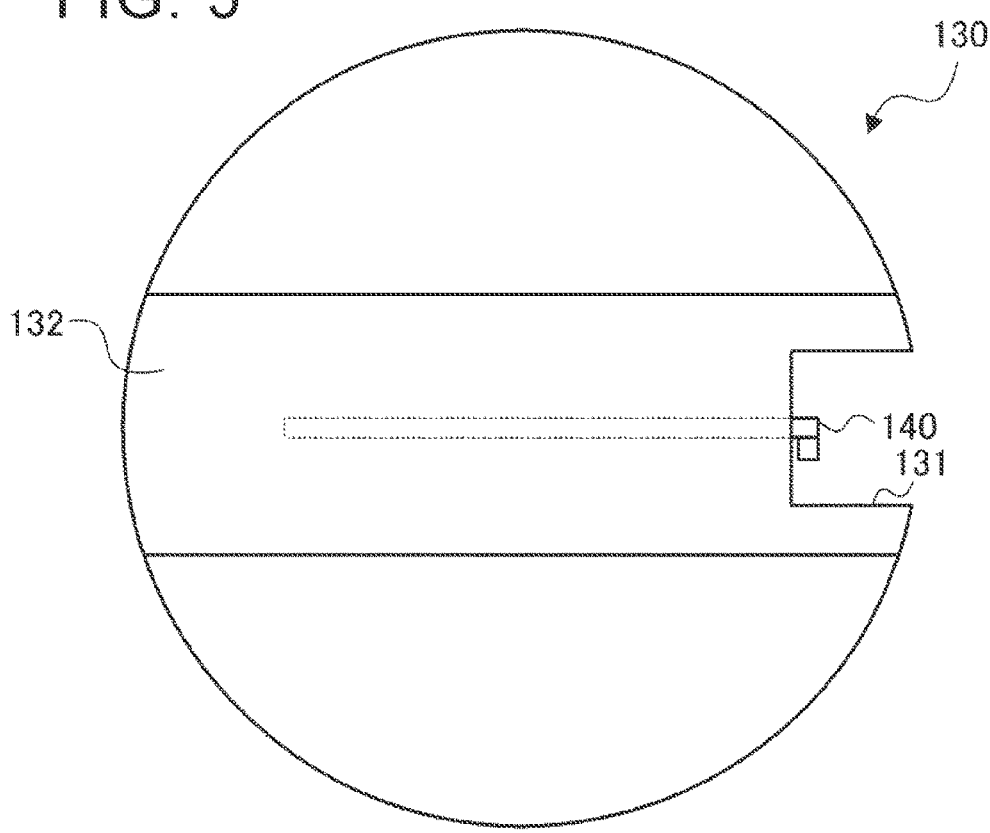
FIG. 5 is a plan view of the mounting portion in a state in which the tip of the arm is pulled toward the mounting portion.

Here, the horizontal movement of the arm 140 is shown in the drawings. FIG. 4 is a plan view of the mounting portion 130 in a state in which the tip of the arm 140 protrudes outward of the mounting portion 130 in the horizontal direction. Further, FIG. 5 is a plan view of the mounting portion 130 in a state in which the tip of the arm 140 is pulled toward the mounting portion 130. As shown in the drawings, the cutout 131 of the mounting portion 130 is a cutout having a predetermined length extending from the outer peripheral end of the mounting portion 130 along the axis of the arm 140. Specifically, for example, as shown in FIG. 5, the position of the end of the cutout 131 corresponds to the position of the tip (protruding portion 142) of the arm 140 when the arm 140 is most pulled toward the mounting portion 130. As described above, the mounting portion 130 is provided with the cutout 131. Therefore, the protruding portion 142 of the arm 140 can be pulled in to the inside of the outer circumference of the mounting portion 130.

In the present embodiment, when the protruding portion 142 faces upward, the operation of the arm 140 is hindered without the cutout 131. Therefore, the cutout 131 is provided. However, when the operation of the arm 140 is not hindered, the cutout 131 may not be provided.

The wireless communication unit 160 is a circuit for performing wireless communication to communicate with a server or another robot as needed, and includes, for example, a wireless transmission and reception circuit and an antenna. Note that, when the autonomous mobile robot 10 does not communicate with other devices, the wireless communication unit 160 may be omitted.

The control unit 100 is a device that controls the autonomous mobile robot 10, and includes a processor 101, a memory 102, and an interface 103. The processor 101, the memory 102, and the interface 103 are connected to each other via a data bus or the like.

The interface 103 is an input and output circuit used for communicating with other devices such as the moving portion 110, the telescopic portion 120, the arm drive mechanism 150, and the wireless communication unit 160.

The memory 102 is composed of, for example, a combination of a volatile memory and a non-volatile memory. The memory 102 is used to store software (computer program) including one or more commands to be executed by the processor 101, data used for executing various processes of the autonomous mobile robot 10, and the like.

The processor 101 reads software (computer program) from the memory 102 and executes the software to execute processes of the control unit 100, which will be described later.

The processor 101 may be, for example, a microprocessor, a microprocessor unit (MPU), or a central processing unit (CPU). The processor 101 may include a plurality of processors. As described above, the control unit 100 is a device that functions as a computer.

The above-mentioned program can be stored and supplied to a computer using various types of non-transitory computer-readable media. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). Further, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Next, the processes of the control unit 100 will be described.

The control unit 100 controls the operation of the autonomous mobile robot 10. That is, the control unit 100 controls the operations of the moving portion 110, the telescopic portion 120, and the arm 140. The control unit 100 can control the rotation of each drive wheel 112 and move the robot body 111 to an arbitrary position by transmitting the control signal to each motor 114 of the moving portion 110. Further, the control unit 100 can control the height of the mounting portion 130 by transmitting the control signal to the driving device 121 of the telescopic portion 120. Further, the control unit 100 can control the horizontal movement of the arm 140 and rotation of the protruding portion 142 by transmitting the control signal to the arm drive mechanism 150.

As described above, the control unit 100 may control movement of the autonomous mobile robot 10 by executing known control such as feedback control or robust control based on rotation information of the drive wheels 112 detected by rotation sensors provided for the drive wheels 112. Further, the control unit 100 may cause the autonomous mobile robot 10 to move autonomously by controlling the moving portion 110 based on information such as distance information detected by a distance sensor such as a camera or an ultrasonic sensor provided for the autonomous mobile robot 10 and map information of the moving environment.

Figure 6:
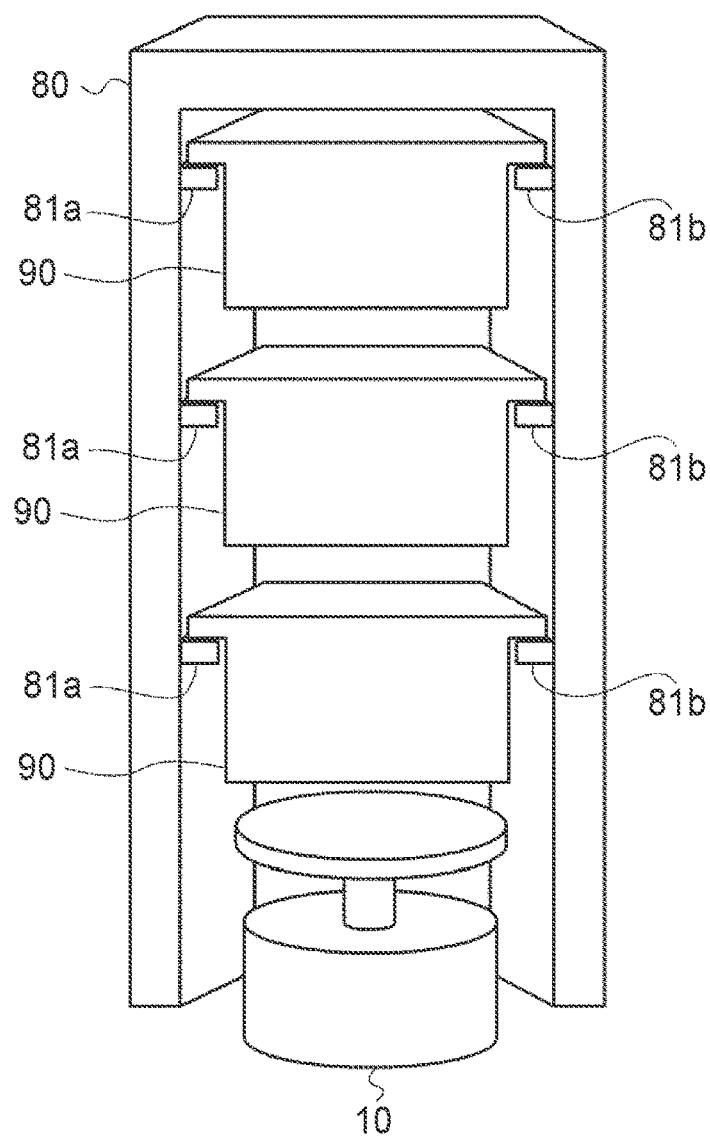
FIG. 6 is a schematic view showing a rack and objects, each of which is a transport target and housed in the rack.
Figure 7:
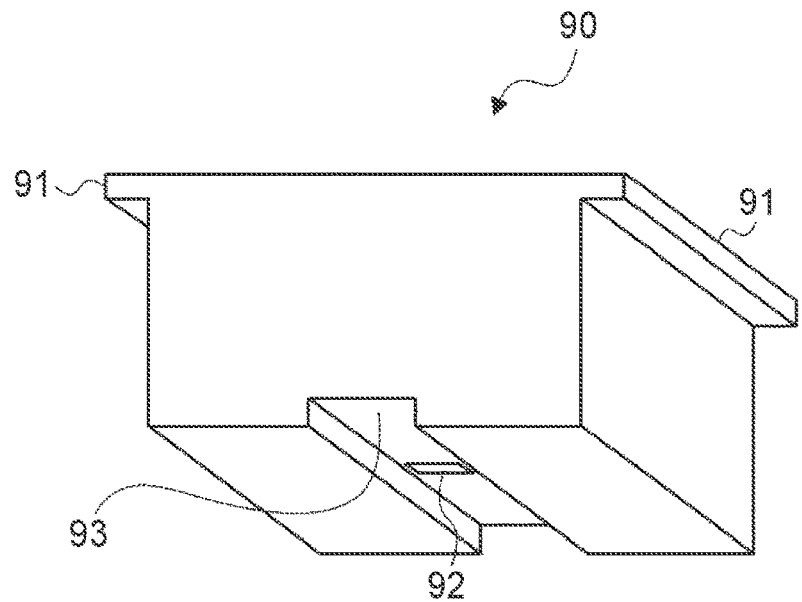
FIG. 7 is a perspective view showing the front surface, the bottom surface, and the side surface of the object.
Figure 8:
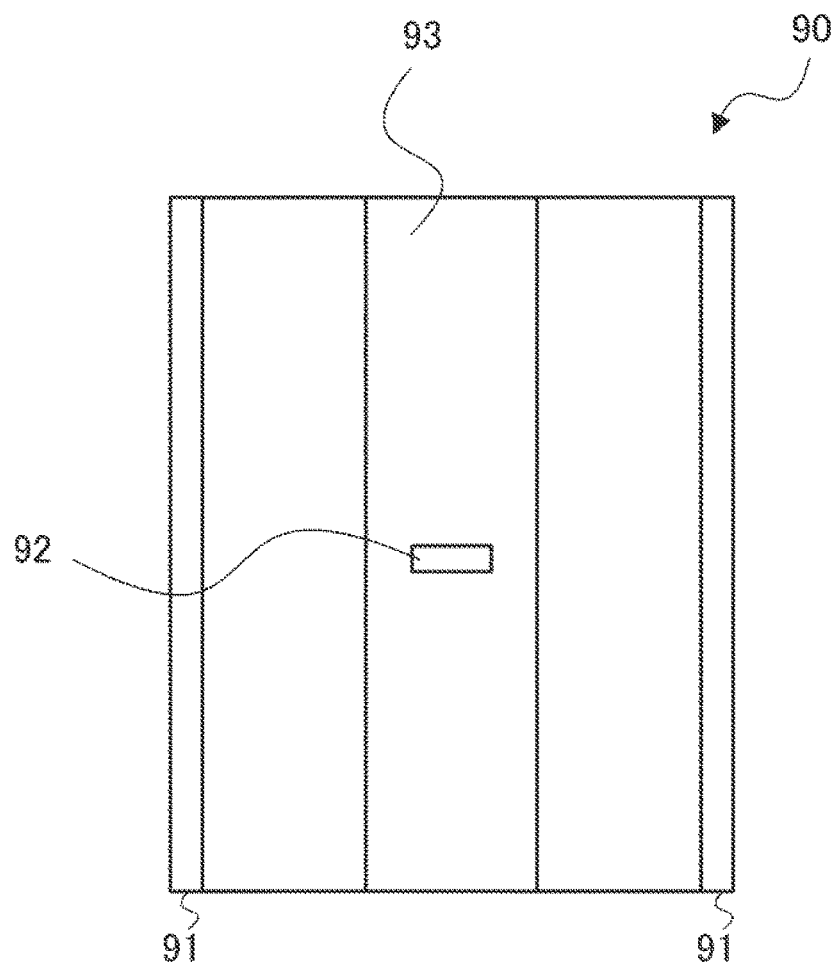
FIG. 8 is a bottom view of the object.

Here, a transport target object of the autonomous mobile robot 10 will be specifically described. FIG. 6 is a schematic view showing a rack 80 and objects 90, each of which is the transport target and housed in the rack 80. Note that FIG. 6 also shows the autonomous mobile robot 10 disposed in front of the rack 80. FIG. 7 is a perspective view showing the front surface, the bottom surface, and the side surface of the object 90. Further, FIG. 8 is a bottom view of the object 90. As shown in FIG. 6, the autonomous mobile robot 10 moves to a position close to the rack 80 when the autonomous mobile robot 10 moves the object 90 of the rack 80 to the mounting portion 130 or when the autonomous mobile robot 10 moves the object 90 mounted on the mounting portion 130 to the rack 80. More specifically, for example, the autonomous mobile robot 10 moves in front of the rack 80 and at an intermediate point between a pair of rails 81a, 81b of the rack 80.

The rack 80 includes the rails 81a, 81b that support respective sides of the object 90. The rails 81a, 81b are provided in parallel at the same height. One side of the object 90 housed in the rack 80 is supported by the rail 81a, and the other side of the object 90 is supported by the rail 81b. The rails 81a, 81b are both provided to extend from the front surface to the back surface of the rack 80.

For example, as shown in FIG. 7, flanges 91 are provided on respective sides of the object 90. The object 90 is supported in the rack 80 as the flanges 91 are supported by the rails 81a, 81b from below. Note that, the flanges 91 are provided on the respective sides of the object 90 from the front surface to the back surface. In the example shown in FIG. 7, the flanges 91 are each provided in an upper portion of the side of the object 90. However, the flange 91 may be provided in a lower portion, for example, and may not necessarily be provided in the upper portion. Further, when the rails 81a, 81b support the bottom surface of the object 90, the object 90 does not necessarily have to be provided with the flanges 91.

As described above, the rack 80 supports both sides of the object 90 from below by the rails 81a, 81b. Then, the object 90 can move in a front-rear direction in the rack 80 along the rails 81a, 81b. That is, the object 90 is housed in the rack 80 by pushing the object 90 toward the back surface of the rack 80. Conversely, the object 90 can be taken out from the rack 80 by pulling out the object 90 toward the front of the rack 80.

As shown in FIGS. 7 and 8, a groove 93 is provided on the bottom surface of the object 90. The groove 93 corresponds to the shape of the guide 132 provided in the mounting portion 130 as a protruding portion. The groove 93 is provided in parallel to the moving direction of the object 90 in the rack 80 when the object 90 is taken in and out of the rack 80. In the examples shown in FIGS. 7 and 8, specifically, the groove 93 is provided so as to pass through the center of the bottom surface of the object 90 and in parallel to the direction in which the flanges 91 extend. Further, a hole 92 for hooking the protruding portion 142 of the arm 140 is provided at a predetermined position on the bottom surface of the object 90. In the examples shown in FIGS. 7 and 8, the hole 92 is provided at the bottom of the groove 93. The object 90 is, for example, a rectangular parallelepiped container (box). However, the object 90 is not limited to this and may be any object. The object 90 can accommodate any other object as a container.

Figure 9:
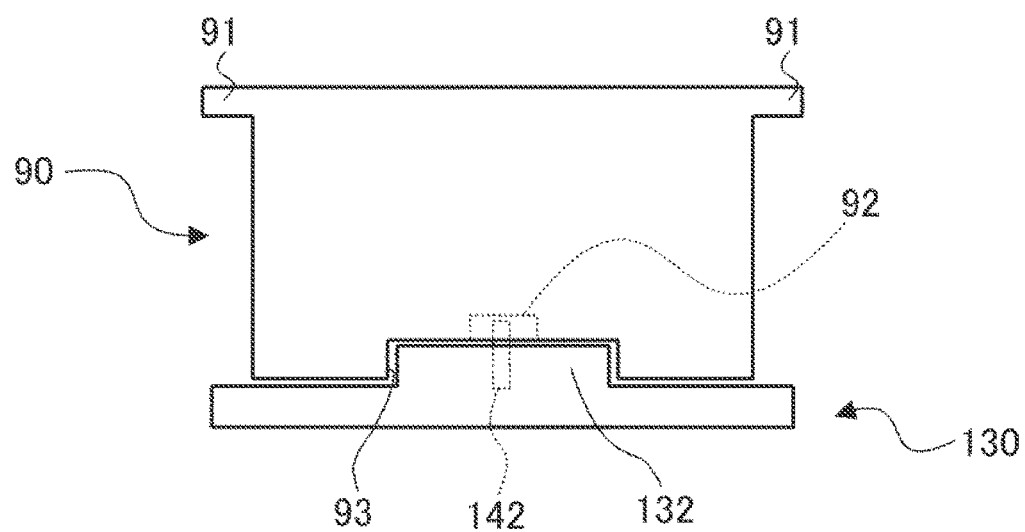
FIG. 9 is a schematic view showing a state in which a guide of a mounting portion according to a first embodiment is fitted into a groove of the object.

FIG. 9 is a schematic view showing a state in which the guide 132 of the mounting portion 130 is fitted into the groove 93 of the object 90, and shows a state in which the upper plate consisting the mounting portion 130 and the object 90 are viewed from the front (the rear surfaces thereof). Note that, FIG. 9 also shows a state in which the protruding portion 142 of the arm 140 is inserted into the hole 92 on the bottom surface of the object 90. As shown in FIG. 9, in the present embodiment, the sectional shapes of the guide 132 and the groove 93 are rectangular. As described above, in the state in which the guide 132 is fitted into the groove 93 of the object 90, the moving direction of the object 90 on the mounting portion 130 is limited to the direction of the guide 132. Therefore, when the object 90 moves between the mounting portion 130 and the rack 80 as the object 90 slides therebetween, the rotation of the object 90 can be suppressed and movement of the object 90 can be stabilized. Accordingly, it is possible to easily load and unload the object to and from the mounting portion 130 by moving the object 90 on the mounting portion 130. Further, when the object 90 does not move between the mounting portion 130 and the rack 80, it is possible to suppress the object 90 on the mounting portion 130 from falling. Further, the protruding portion 142 can project upward from the upper surface of the mounting portion 130. Therefore, when the control unit 100 inserts the protruding portion 142 in the hole 92 provided on the bottom surface of the object 90 mounted on the mounting portion 130, the movement of the object 90 in the direction of the guide 132 is also restricted, whereby the object 90 can be further suppressed from falling.

Figure 10:
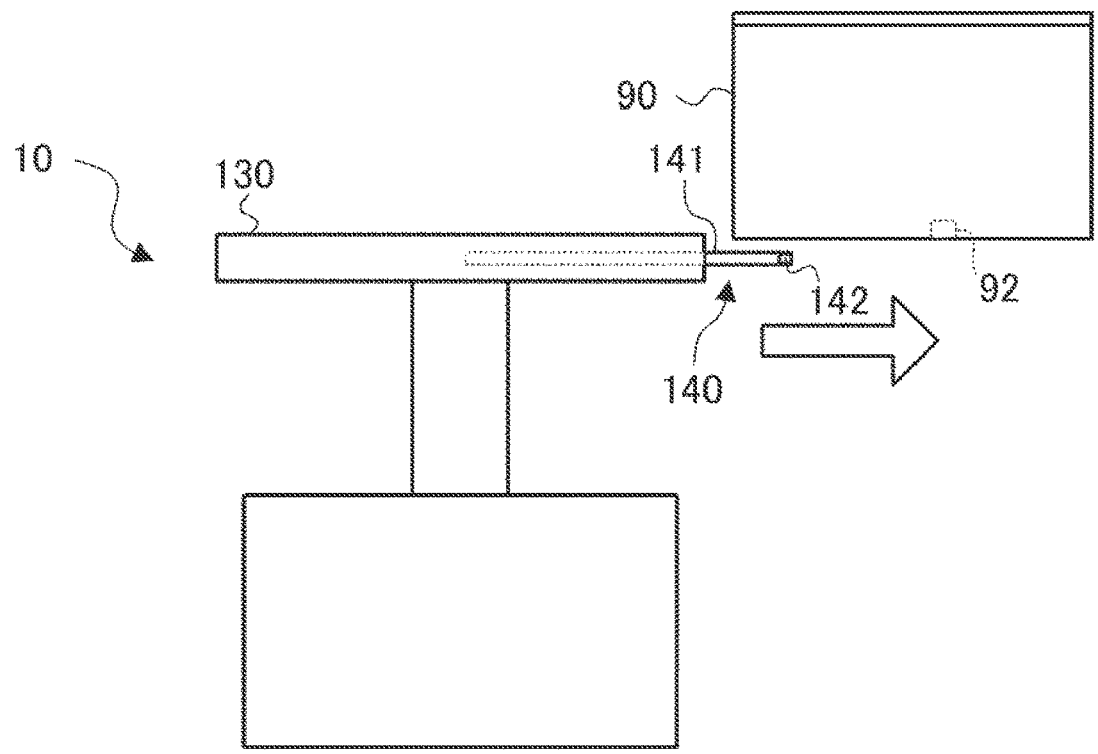
FIG. 10 is a schematic view showing an operation of mounting the object housed in the rack on the mounting portion.
Figure 11:
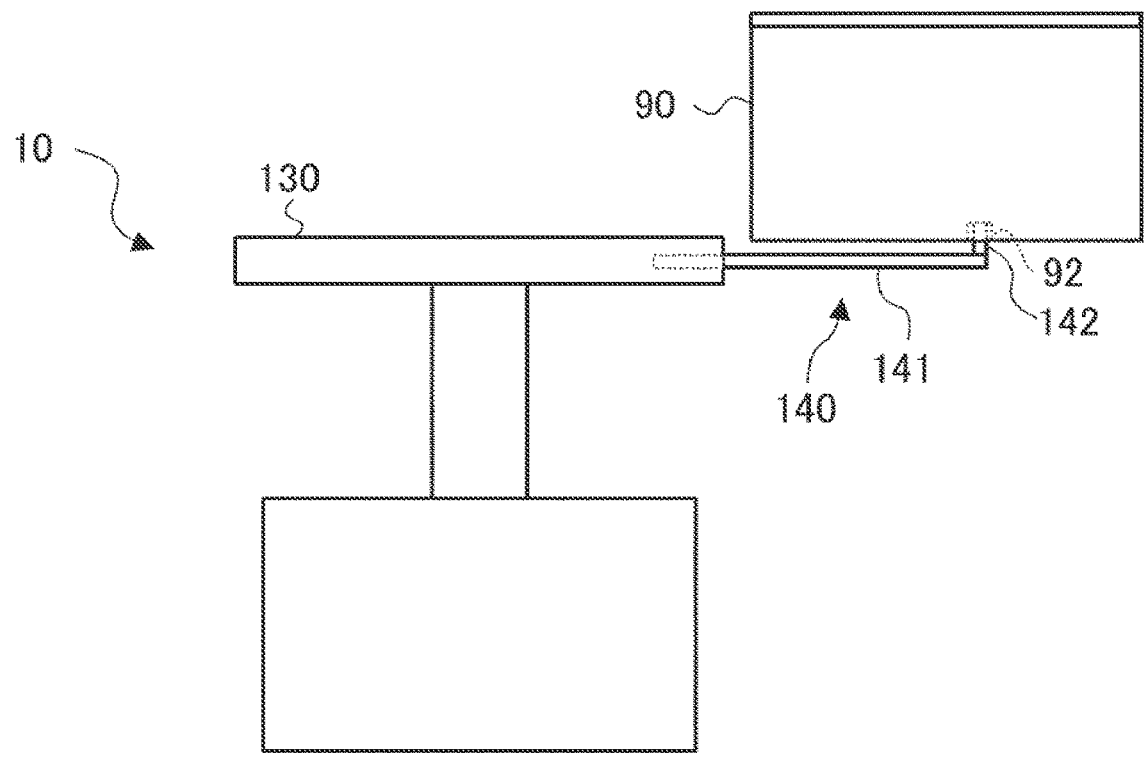
FIG. 11 is a schematic view showing the operation of mounting the object housed in the rack on the mounting portion.
Figure 12:
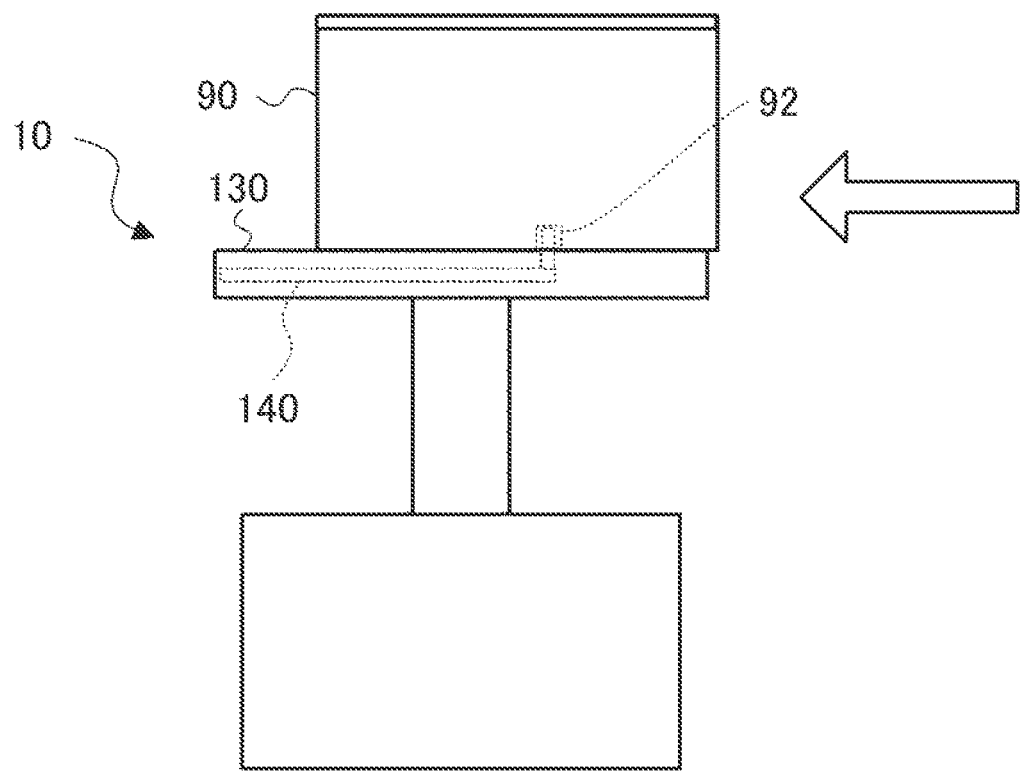
FIG. 12 is a schematic view showing the operation of mounting the object housed in the rack on the mounting portion.

The control unit 100 of the autonomous mobile robot 10 moves the object 90 from the rack 80 to the mounting portion 130 or moves the object 90 from the mounting portion 130 to the rack 80, by operating the arm 140. FIGS. 10 to 12 are schematic views showing an operation of mounting the object 90 housed in the rack 80 on the mounting portion 130.

As shown in FIG. 10, first, the control unit 100 sends out the arm 140 from the mounting portion 130 by a predetermined length, and moves the tip end (protruding portion 142) of the arm toward the hole 92 on the bottom surface of the object 90. At this time, the protruding direction of the protruding portion 142 is preferably the horizontal direction so as to insert the arm 140 into a narrow space on the bottom surface side of the object 90 that is the transport target (for example, a narrow clearance between the object 90 housed one step below the object 90 that is the transport object and the object 90 that is the transport object).

Next, as shown in FIG. 11, the control unit 100 rotates the protruding portion 142 with the shaft portion 141 of the arm 140 as a rotation axis. Specifically, the control unit 100 rotates the protruding portion 142 such that the protruding portion 142 faces upward. With this operation, the protruding portion 142 enters the hole 92 of the object 90. As described above, in the present embodiment, the state of the arm 140 for hooking the tip of the arm 140 on the groove and the state of the arm 140 for not hooking the tip of the arm 140 on the groove can be easily switched by rotation of the protruding portion 142.

Next, as shown in FIG. 12, the control unit 100 returns the tip (protruding portion 142) of the arm 140 caught in the hole 92 toward the mounting portion 130. With this operation, the object 90 is pulled out from the rack 80 and moves from the rack 80 onto the mounting portion 130. At this time, the object 90 moves on the mounting portion 130 with the guide 132 of the mounting portion 130 fitted into the groove 93 on the bottom surface of the object 90.

On the other hand, the control unit 100 moves the tip of the arm 140 caught in the hole 92 of the object 90 mounted on the mounting portion 130 toward the rack 80, that is, the control unit 100 sends out the arm 140 by a predetermined length from the mounting portion 130 in the state in which the protruding portion 142 is inserted into the hole 92, such that the object 90 on the mounting portion 130 can be housed in the rack 80. At this time, the object 90 also moves on the mounting portion 130 with the guide 132 of the mounting portion 130 fitted into the groove 93 on the bottom surface of the object 90.

In the present embodiment, the position of the hole 92 of the object 90 is predetermined. That is, the distance from the autonomous mobile robot 10 located in front of the rack 80 to the hole 92 is predetermined. Therefore, in the present embodiment, the control unit 100 sends out the arm 140 from the mounting portion 130 by a length corresponding to the distance. However, for example, the autonomous mobile robot 10 may include a sensor such as a camera that detects the position of the hole 92 of the object 90. In this case, the control unit 100 may determine the length by which the arm 140 is sent out from the mounting portion 130 based on the detection result by the sensor.

When the object is moved between the mounting portion 130 and the rack 80, the height of the mounting portion 130 is adjusted in advance to a height suitable for moving the object. That is, the control unit 100 executes control such that the height of the mounting portion 130 becomes a predetermined height in advance. Specifically, the control unit 100 controls the height of the mounting portion 130 to be a height corresponding to the height of the position at which the object 90 is housed in the rack 80. That is, in the case of moving the object from the rack 80 to the mounting portion 130, the control unit 100 adjusts the height of the mounting portion 130 to be the height that allows the guide 132 of the mounting portion 130 to fit into the groove 93 on the bottom surface of the object 90. Further, in the case of moving the object from the mounting portion 130 to the rack 80, the control unit 100 adjusts the height of the mounting portion 130 such that the height of the flanges 91 of the object 90 on the mounting portion 130 becomes the height of the rails 81a, 81b.

As shown in FIGS. 7 and 8, the number of holes 92 of the object 90 may be one. However, a plurality of the holes 92 may be provided at intervals along the direction of the groove 93.

The first embodiment has been described as above. As described above, the mounting portion 130 of the autonomous mobile robot 10 according to the present embodiment includes the guide 132 that engages with the object 90 and regulates the moving direction of the object 90 on the surface of the mounting portion 130 to the predetermined direction. Therefore, the moving direction of the object 90 on the mounting portion 130 is limited to the direction of the guide 132. Therefore, when the object 90 moves between the mounting portion 130 and the rack 80 as the object 90 slides therebetween, the rotation of the object 90 can be suppressed and movement of the object 90 can be stabilized. Accordingly, it is possible to easily load and unload the object to and from the mounting portion 130 by moving the object 90 on the mounting portion 130. Further, when the object 90 does not move between the mounting portion 130 and the rack 80, it is possible to suppress the object 90 on the mounting portion 130 from falling.

Second Embodiment

Hereinafter, a second embodiment will be described. In the first embodiment, the mounting portion 130 is provided with the guide 132 of the protruding portion, and the groove 93 is provided on the bottom surface of the object 90. However, the arrangement of the protruding portion and the groove may be reversed.

Figure 13:
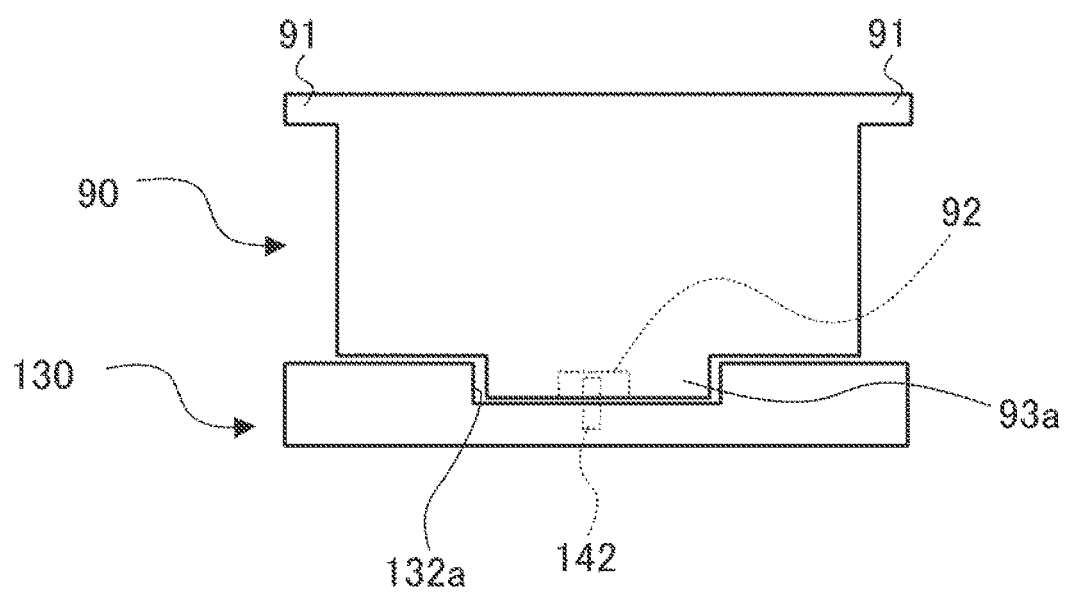
FIG. 13 is a schematic view showing a state in which a guide of a mounting portion according to a second embodiment is fitted with a protruding portion of the object.

FIG. 13 is a schematic view showing a state in which a guide 132a of the mounting portion 130 is fitted with a protruding portion 93a of the object 90, and shows a state in which the upper plate consisting the mounting portion 130 and the object 90 are viewed from the front (the rear surfaces thereof). In the present embodiment, the mounting portion 130 includes the guide 132a that engages with the object 90 mounted on the mounting portion 130 and regulates the moving direction of the object 90 on the surface of the mounting portion 130 to the predetermined direction. Then, the guide 132a is a groove extending in the predetermined direction on the upper surface of the mounting portion 130. As shown in FIG. 13, a protruding portion 93a is provided on the bottom surface of the object 90. The protruding portion 93a corresponds to the shape of the guide 132a provided in the mounting portion 130 as a groove. The protruding portion 93a is provided in parallel to the moving direction of the object 90 in the rack 80 when the object 90 is taken in and out of the rack 80. In the examples shown in FIG. 13, specifically, the protruding portion 93a is provided so as to pass through the center of the bottom surface of the object 90 and in parallel to the direction in which the flanges 91 extend. Further, the hole 92 for hooking the protruding portion 142 of the arm 140 is provided at a predetermined position on the lower surface of the protruding portion 93a. Note that, FIG. 13 also shows a state in which the protruding portion 142 of the arm 140 is inserted into the hole 92 on the bottom surface of the object 90. As shown in FIG. 13, in the present embodiment, the sectional shapes of the guide 132a and the protruding portion 93a are rectangular. The same effect as that of the first embodiment can be obtained by fitting the guide 132a onto the protruding portion 93a of the object 90 as described above.

In the first embodiment, the object 90 has a groove 93 as a configuration for engaging with the guide 132, and the hole 92 is provided on the surface of the groove 93. Therefore, when the object 90 is a container (box), the depth of the container becomes shallow by a length corresponding to the sum of the depth of the groove 93 and the depth of the hole 92. On the other hand, in the present embodiment, the object 90 includes a protruding portion 93a instead of a groove as a configuration for engaging with the guide 132a, and the hole 92 is provided on the surface of the protruding portion 93a. Therefore, it is possible to suppress a decrease in the depth of the container due to provision of the hole 92. That is, it is possible to suppress a decrease in the volume of the container.

Third Embodiment

Hereinafter, a third embodiment will be described. In the first embodiment, the sectional shapes of the guide 132 of the mounting portion 130 and the groove 93 on the bottom surface of the object 90 are rectangular. Therefore, even when the guide 132 fits into the groove 93, the movement of the object 90 in the vertical direction is not restricted. On the other hand, in the present embodiment, a configuration capable of suppressing the movement of the object 90 in the vertical direction is shown.

Figure 14:
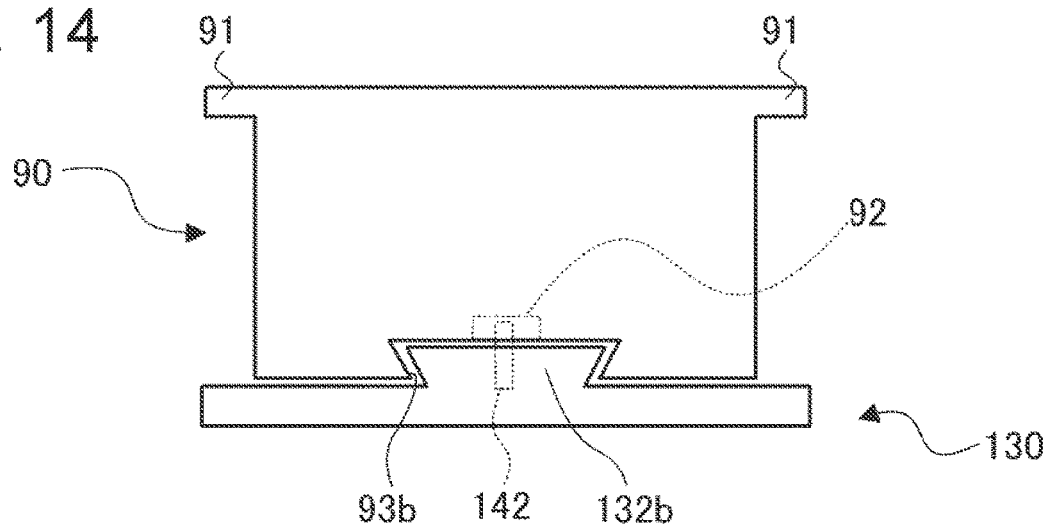
FIG. 14 is a schematic view showing a state in which a guide of a mounting portion according to a third embodiment is fitted into a groove of the object.

FIG. 14 is a schematic view showing a state in which a guide 132b of the mounting portion 130 is fitted into a groove 93b of the object 90, and shows a state in which the upper plate consisting the mounting portion 130 and the object 90 are viewed from the front (the rear surfaces thereof). In the present embodiment, the mounting portion 130 includes the guide 132b that engages with the object 90 mounted on the mounting portion 130 and regulates the moving direction of the object 90 on the surface of the mounting portion 130 to the predetermined direction. Similar to the guide 132 described above, the guide 132b is a protruding portion extending in the predetermined direction on the upper surface of the mounting portion 130. However, the guide 132b further has the following features as shown in FIG. 14. The side surface of the guide 132b (protruding portion) along the predetermined direction has a shape protruding outward in the width direction above the lower end of the protruding portion. Here, the width direction is a direction orthogonal to the predetermined direction on the surface of the mounting portion 130, and is a right-left direction in FIG. 14. Note that, it can be said that the guide 132b shown in FIG. 14 has the following features. That is, it can be said that the side surface of the guide 132b (protruding portion) along the predetermined direction is inclined outward. With this configuration, the upper portion of the guide 132b projects outward in the width direction. Further, it can be said that the guide 132b shown in FIG. 14 has a tapered shape in which the upper portion extends outward.

As shown in FIG. 14, the groove 93b is provided on the bottom surface of the object 90. The groove 93b corresponds to the shape of the guide 132b provided for the mounting portion 130 as a protruding portion. The groove 93b is provided in parallel to the moving direction of the object 90 in the rack 80 when the object 90 is taken in and out of the rack 80. In the examples shown in FIG. 14, specifically, the groove 93b is provided so as to pass through the center of the bottom surface of the object 90 and in parallel to the direction in which the flanges 91 extend. Further, the hole 92 for hooking the protruding portion 142 of the arm 140 is provided at a predetermined position at the bottom of the groove 93b. Note that, FIG. 14 also shows a state in which the protruding portion 142 of the arm 140 is inserted into the hole 92 on the bottom surface of the object 90. As shown in FIG. 14, the side surface of the groove 93b along the predetermined direction has a shape protruding outward in the width direction above the lower end of the groove 93b, that is, above the opening end of the groove 93b. In other words, it can be said that the side surface of the groove 93b along the predetermined direction is inclined inward so as to narrow the width of the opening. With this configuration, the bottom side of the groove 93b projects outward in the width direction. Further, it can be said that the groove 93b shown in FIG. 14 has a tapered shape in which the upper portion extends outward. In the present embodiment, in addition to the same effects as in the first embodiment, the following effects can be obtained. In the present embodiment, when the guide 132b fits into the groove 93b of the object 90, protrusion of the guide 132b and the groove 93b in the width direction hinders the movement of the object 90 in the vertical direction. Therefore, it is possible to further suppress falling of the object 90 when the autonomous mobile robot 10 transports the object 90, etc.

Figure 15:
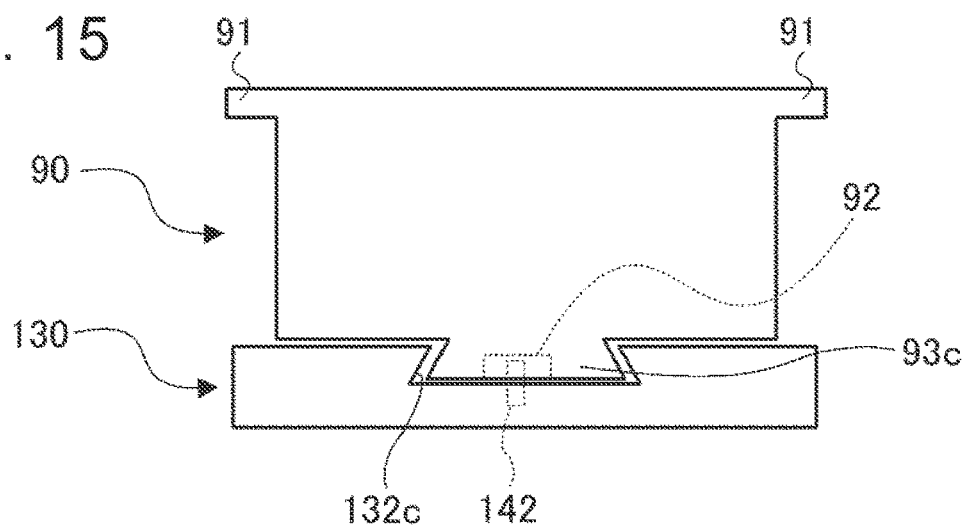
FIG. 15 is a schematic view showing a state in which a guide of a mounting portion according to a modification of the third embodiment is fitted with the protruding portion of the object.

In the example shown in FIG. 14, the mounting portion 130 is provided with the guide 132b that is a protruding portion, and the groove 93b is provided on the bottom surface of the object 90. However, as shown in FIG. 15, the arrangement of the protruding portion and the groove may be reversed. FIG. 15 is a schematic view showing a state in which a guide 132c of the mounting portion 130 according to a modification of the third embodiment is fitted with a protruding portion 93c of the object 90, and shows a state in which the upper plate consisting the mounting portion 130 and the object 90 are viewed from the front (the rear surfaces thereof). Also in the present modification, the mounting portion 130 includes the guide 132c that engages with the object 90 mounted on the mounting portion 130 and regulates the moving direction of the object 90 on the surface of the mounting portion 130 to the predetermined direction. Similar to the guide 132a according to the second embodiment, the guide 132c is a groove extending in the predetermined direction on the upper surface of the mounting portion 130. However, the guide 132c further has the following features as shown in FIG. 15. The side surface of the guide 132c (groove) along the predetermined direction has a shape protruding outward in the width direction below the upper end of the groove, that is, below the opening end. Note that, it can be said that the guide 132c shown in FIG. 15 has the following features. That is, it can be said that the side surface of the guide 132c (groove) along the predetermined direction is inclined inward so as to narrow the width of the opening. With this configuration, the lower portion of the guide 132c projects outward in the width direction. Further, it can be said that the guide 132c shown in FIG. 15 has a tapered shape in which the lower portion extends outward.

As shown in FIG. 15, the protruding portion 93c is provided on the bottom surface of the object 90. The protruding portion 93c corresponds to the shape of the guide 132c provided in the mounting portion 130 as a groove. The protruding portion 93c is provided in parallel to the moving direction of the object 90 in the rack 80 when the object 90 is taken in and out of the rack 80. In the examples shown in FIG. 15, specifically, the protruding portion 93c is provided so as to pass through the center of the bottom surface of the object 90 and in parallel to the direction in which the flanges 91 extend. Further, the hole 92 for hooking the protruding portion 142 of the arm 140 is provided at a predetermined position on the lower surface of the protruding portion 93c. Note that FIG. 15 also shows the state in which the protruding portion 142 of the arm 140 is inserted into the hole 92 on the bottom surface of the object 90. As shown in FIG. 15, the side surface of the protruding portion 93c along the predetermined direction has a shape protruding outward in the width direction below the upper end of the protruding portion 93c, that is, below the base of the protruding portion 93c. In other words, it can be said that the side surface of the protruding portion 93c along the predetermined direction is inclined outward so as to enlarge the width of the tip. With this configuration, the tip side of the protruding portion 93c projects outward in the width direction. Further, it can be said that the protruding portion 93c shown in FIG. 15 has a tapered shape in which the lower portion extends outward. The configuration shown in FIG. 15 can also suppress the object 90 from moving in the vertical direction.

Fourth Embodiment

As shown in FIGS. 13 and 15, in the case where a protruding portion is provided on the bottom surface of the object 90, it becomes unstable when the object 90 is placed on a flat surface. Therefore, as shown in FIG. 16, legs 94 for supporting the object 90 may be provided on the bottom surface of the object 90.

Figure 16:
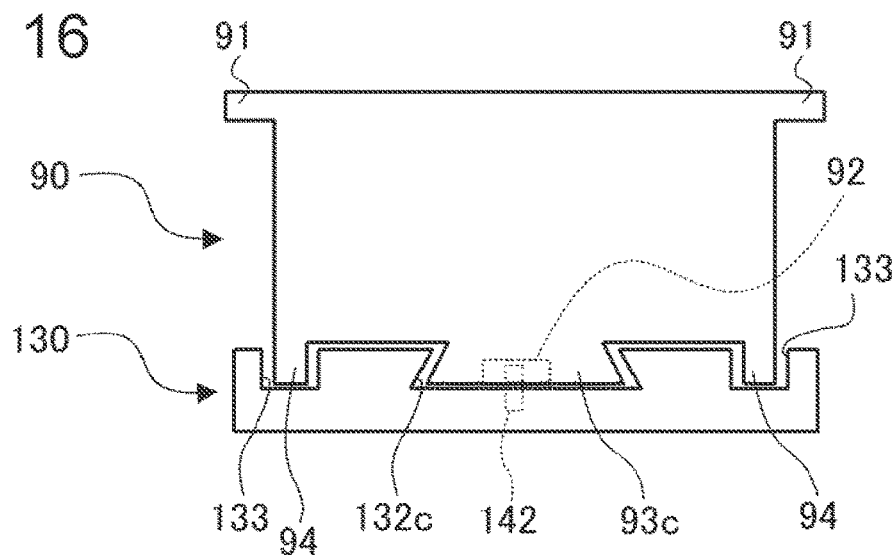
FIG. 16 is a schematic view showing a state in which a guide of a mounting portion according to a fourth embodiment is fitted with a protruding portion of the object.

FIG. 16 is a schematic view showing a state in which the guide 132c of the mounting portion 130 according to a fourth embodiment is fitted with the protruding portion 93c of the object 90, and shows a state in which the upper plate consisting the mounting portion 130 and the object 90 are viewed from the front (the rear surfaces thereof). Since the guide 132c and the protruding portion 93c are described with reference to FIG. 15, the description thereof will be omitted. The engagement structure between the mounting portion 130 and the bottom surface of the object 90 is shown in FIG. 15. However, other shapes may be used for the shape of the guide of the mounting portion 130 and the shape of the protruding portion on the bottom surface of the object 90. For example, as in the second embodiment, the guide 132a and the protruding portion 93a may be used.

The legs 94 are provided on respective sides of the protruding portion 93c on the bottom surface of the object 90. The legs 94 may be extended along the protruding portion 93c, or may be provided at respective four corners of the bottom surface of the object 90. In the present embodiment, the mounting portion 130 includes recessed portions 133 (grooves) on the respective sides of the guide 132c (groove) such that the legs 94 of the object 90 are supported by the mounting portion 130 in a state in which the protruding portion 93c of the object 90 is fitted into the guide 132c. The recessed portions 133 extend in the predetermined direction. Note that, the guide 132c is provided so as to pass through the center of the mounting portion 130, for example. In this case, when the object 90 moves on the mounting portion 130 along the guide 132c, the legs 94 of the object 90 move in the recessed portions 133 extending in the predetermined direction. The configuration of the mounting portion 130 described above makes it possible to move the object 90 on the mounting portion 130 along the guide 132c even when the object 90 provided with the protruding portion on the bottom surface includes the legs.

Fifth Embodiment

Figure 17:
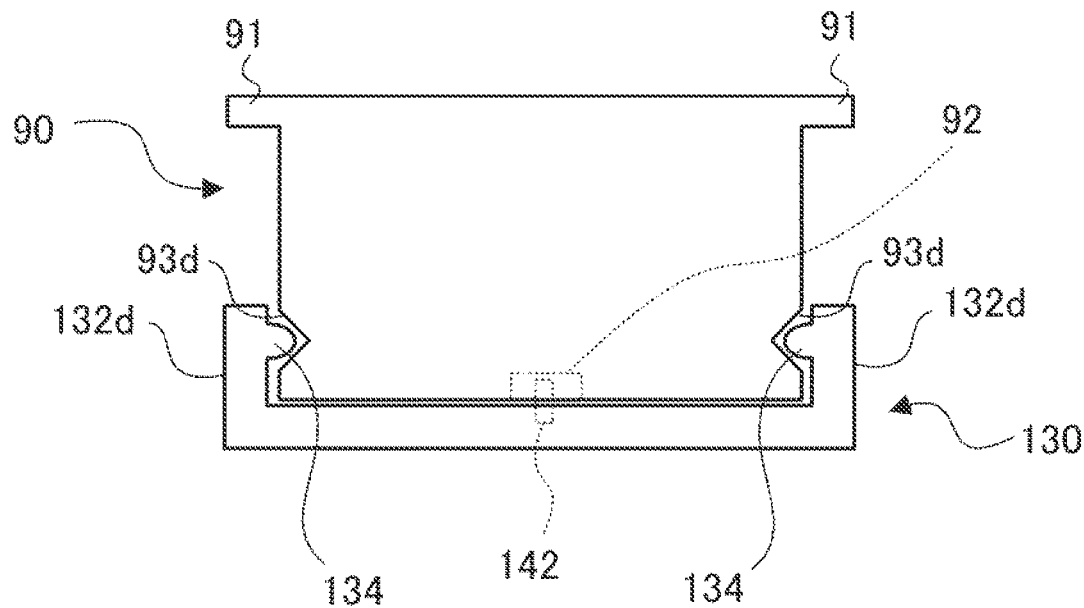
FIG. 17 is a schematic view showing a state in which a guide of a mounting portion according to a fifth embodiment is fitted in a groove on a side surface of the object.
Figure 18:
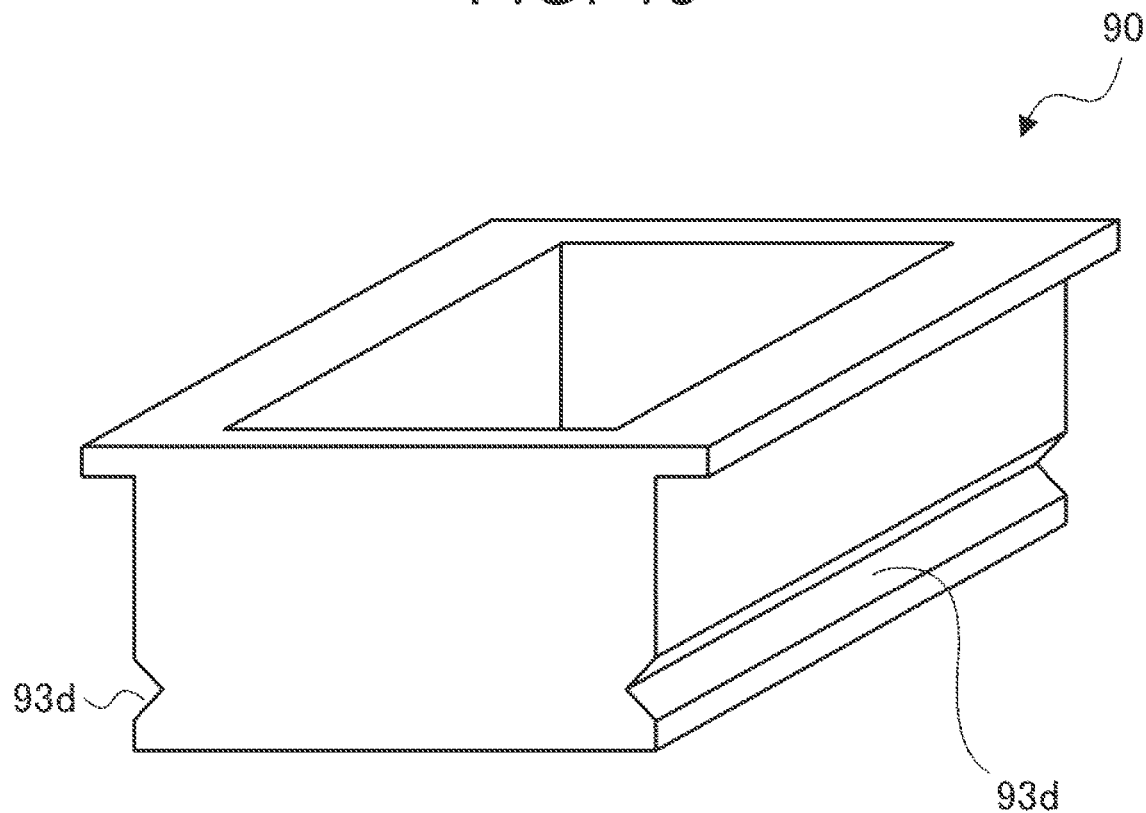
FIG. 18 is a perspective view of the object provided with a groove on a side surface.

In the above-described embodiment, the guide of the mounting portion 130 is engaged with the bottom surface of the object 90. However, the guide of the mounting portion 130 may be engaged with the side surface of the object 90. FIG. 17 is a schematic view showing a state in which guides 132d of the mounting portion 130 are fitted into grooves 93d on the side surfaces of the object 90, and shows a state in which the upper plate consisting the mounting portion 130 and the object 90 are viewed from the front (the rear surfaces thereof). In the present embodiment, the mounting portion 130 includes the guides 132d that engage with the object 90 mounted on the mounting portion 130 and regulate the moving direction of the object 90 on the surface of the mounting portion 130 to the predetermined direction. Here, the guides 132d are two rails 134 facing inward with each other extending in the predetermined direction at an interval corresponding to the width of the object 90. The two rails 134 extend to a predetermined height from the upper surface of the mounting portion 130. Here, the predetermined height is the height at which the rails 134 fit into the grooves 93d on the side surfaces of the object 90 mounted on the mounting portion 130. As shown in FIG. 17, the grooves 93d corresponding to the shape of the two rails 134 that are the guides 132d are provided on the side surfaces of the object 90. As shown in FIG. 18, the grooves 93d are provided in parallel to the moving direction of the object 90 in the rack 80 when the object 90 is taken in and out of the rack 80. The object 90 is provided with the hole 92 for hooking the protruding portion 142 of the arm 140 at the predetermined position on the bottom surface. FIG. 17 shows the state in which the protruding portion 142 of the arm 140 is inserted into the hole 92 on the bottom surface of the object 90. Even in such a configuration in which the guides 132d of the mounting portion 130 engage with the side surfaces of the object 90, the same effect as that of the first embodiment can be obtained.

Figure 19:
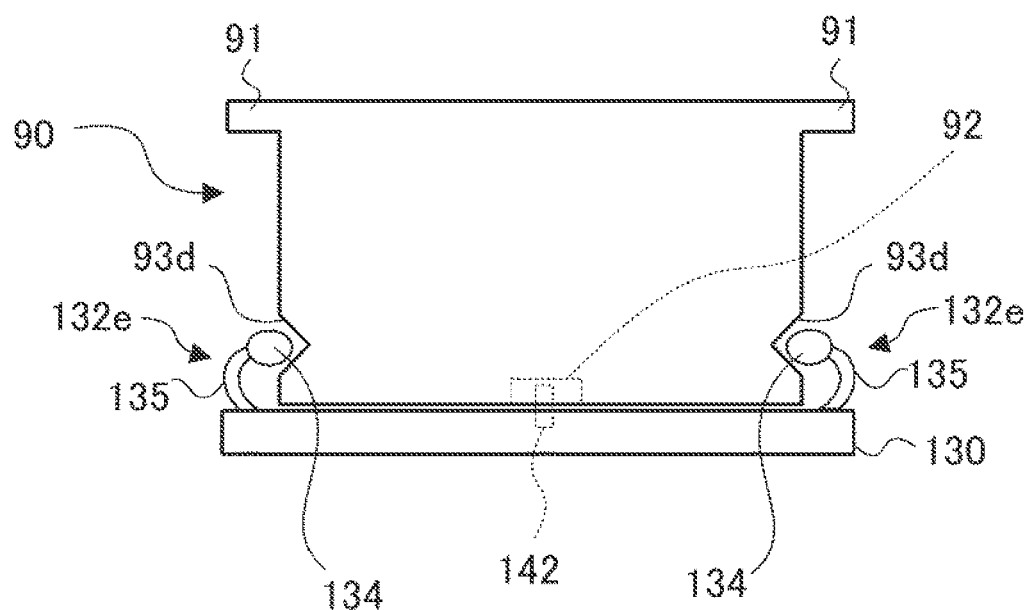
FIG. 19 is a schematic view showing a state in which a guide of a mounting portion according to a modification of the fifth embodiment is fitted into a groove on the side surface of the object.

In the example shown in FIG. 17, the guides 132d are fixed on the mounting portion 130 such that the widths of the two rails 134 of the guides 132d do not fluctuate. However, the guides may be provided so as to fluctuate due to the action of force applied to the rails 134 as shown in FIG. 19. FIG. 19 is a schematic view showing a state in which guides 132e of the mounting portion 130 according to a modification of the fifth embodiment are fitted into grooves 93d of the object 90, and shows a state in which the upper plate consisting the mounting portion 130 and the object 90 are viewed from the front (the rear surfaces thereof). The guides 132e according to the present modification are different from the guides 132d described above in that the two rails 134 each include an urging member 135 that urges the rail 134 in a direction approaching each other. The urging member 135 is, for example, a spring. However, the urging member 135 is not limited to this, and any known member can be used. According to such a configuration, for example, a person moves the object 90 in the vertical direction with a force of a predetermined magnitude or more to remove the object 90 fitted with the guides 132e or fit the object 90 with the guides 132e. Therefore, convenience is improved.

The present disclosure is not limited to the above embodiments, and can be appropriately modified without departing from the spirit.

What is claimed is:

1. A transport system comprising:
   a container; and
   an autonomous mobile robot configured to transport the container, the autonomous mobile robot including a mounting portion on which the container is configured to be mounted, the mounting portion including a guide that engages with the container mounted on the mounting portion and regulates a moving direction of the container on a surface of the mounting portion to a predetermined direction, the guide being a groove extending in the predetermined direction on an upper surface of the mounting portion, wherein
   the container includes a first protruding portion corresponding to a shape of the groove, the first protruding portion being provided on a bottom surface of the container so as to pass through a center of the bottom surface, and a hole being provided on a bottom surface of the first protruding portion, and
   the autonomous mobile robot includes a second protruding portion that is protrudable upward on an upper surface of the mounting portion, the autonomous mobile robot being configured to make the second protruding portion protrude on the upper surface of the mounting portion and insert the second protruding portion into the hole, wherein the autonomous mobile robot includes:
   an arm including a shaft with the second protruding portion provided on the shaft;
   a motor; and
   a processor configured to control the motor to rotate the shaft to insert the second protruding portion into the hole provided in the first protruding portion of the container and pull the container onto the autonomous mobile robot.

2. The transport system according to claim 1, wherein a side surface of the groove along the predetermined direction has a shape protruding outward in a width direction above an upper end of the groove.

3. The transport system according to claim 1, wherein
   the mounting portion includes a recessed portion extending in the predetermined direction on each side of the groove, and
   the container includes a leg on each side of the first protruding portion on the bottom surface of the container, each leg corresponding to a shape of the recessed portion.

* * * * *